United States Patent

Williamson

[15] 3,706,201

[45] Dec. 19, 1972

[54] DUAL FLUID CROSSOVER CONTROL

[72] Inventor: John S. Williamson, Ellington, Colo.

[73] Assignee: United Aircraft Corporation, East Hartford, Colo.

[22] Filed: Jan. 12, 1970

[21] Appl. No.: 7,427

Related U.S. Application Data

[62] Division of Ser. No. 711,754, Jan. 12, 1970, Pat. No. 3,517,679.

[52] U.S. Cl..............................60/39.28 R, 137/112
[51] Int. Cl.................................................F02c 9/04
[58] Field of Search....60/38.28, 39.06, 39.12, 39.14, 60/39.46; 137/112, 636.4; 123/121

[56] References Cited

UNITED STATES PATENTS

| | | |
|---|---|---|
| 3,299,631 | 1/1967 | Szydlowski ......................60/39.28 R |
| 3,036,585 | 5/1962 | Shawhan .....................137/101.21 X |
| 2,072,384 | 3/1937 | Schmidt ....................................137/6 |
| 2,677,930 | 5/1954 | Carr.......................................60/243 |
| 3,038,486 | 6/1962 | Thurman ....................137/101.21 X |
| 3,433,016 | 3/1969 | Borel ..............................60/39.28 R |
| 3,577,877 | 5/1971 | Warne ............................60/39.28 R |

*Primary Examiner*—Douglas Hart
*Assistant Examiner*—Robert E. Garrett
*Attorney*—Melvin Pearson Williams

[57] ABSTRACT

A dual manifold gas turbine operates on either gaseous fuel or liquid fuel supplied thereto through respective servocontrol valves, the valve relating to fuel in use being controlled by operating conditions of the engine through a servoloop. To change from one fuel to the other, the oncoming valve is controlled by the operating servoloop which has as one input the closing of the offgoing valve. The offgoing valve is closed by a special servoloop used only for that purpose.

3 Claims, 1 Drawing Figure

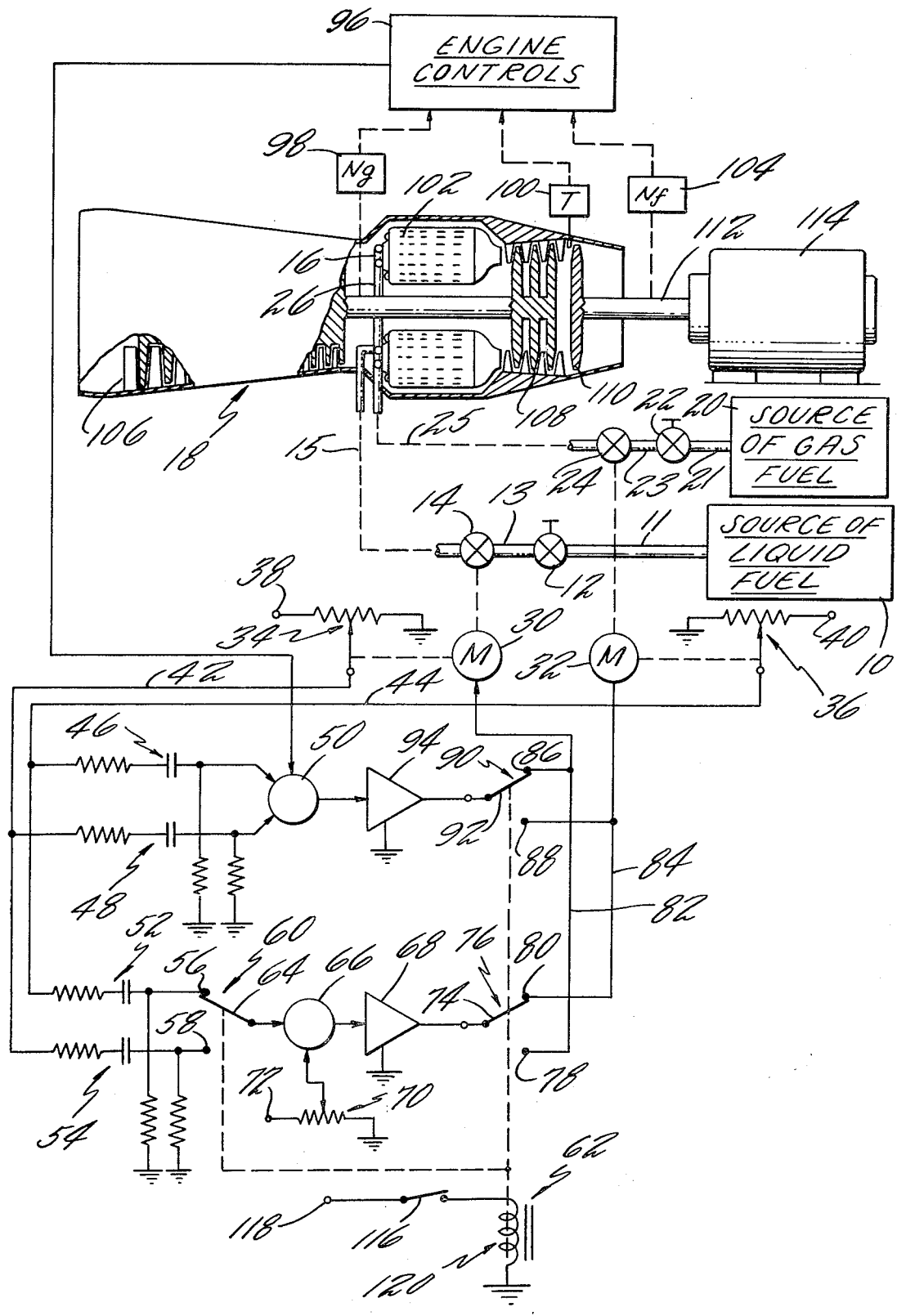

DUAL FLUID CROSSOVER CONTROL

CROSS REFERENCE TO RELATED APPLICATIONS

This is a division of my copending application Ser. No. 711,754 filed Jan. 12, 1970, now U.S. Pat. No. 3,517,679.

BACKGROUND OF THE INVENTION

1. Field of Invention

This invention relates to servo-controlled fluid flow, and more particularly to a servo-crossover control system.

2. Description of the Prior Art

As an example, gas turbines which can operate on either liquid fuel or gaseous fuel are now available. In certain utilizations of gas turbines, it is desirable to be able to switch from liquid fuel to gaseous fuel during operation of the turbine, without introducing any transients into the function being performed by the turbine. It has been found to be unsuitable to merely close off one fuel supply while opening the other.

There are other examples of dual fluid flow systems wherein the selective use of one in preference to the other is required, therefore necessitating a crossover from one to the other. This can occur even when like fluids are being utilized, but the pressure of two separate sources of fluids becomes divergent at the time that crossover is to take place, and that therefore mere substitution of one source for the other would introduce transients into the system.

SUMMARY OF INVENTION

The principal object of the present invention is to provide a control system for permitting a crossover from one fluid flow to another fluid flow in a controlled, interdependent fashion.

According to the present invention, the closing rate of an offgoing valve is utilized to control the opening rate of an oncoming valve, thereby to cause the oncoming valve to open at the same rate at which the offgoing valve is closing. In further accord with the present invention, when a changeover is initiated, the output of the main control servo is fed to the oncoming valve, the output of a closing servoloop is fed to the offgoing valve, and the rate of closing of the offgoing valve is used as an input to the main controlling servoloop; a constant rate signal is used to drive the closing servoloop. In accordance still further with the present invention, utilization of the main control servo for the opening of the oncoming valve with an additional input thereto permits corrections for minor variations in the crossover system to be made by the operating control servoloop during the crossover process, whereby nontransient crossover may be achieved.

Other objects, features and advantages of the present invention will become more apparent in the light of the following detailed description of a preferred embodiment thereof, as illustrated in the accompanying drawing.

BRIEF DESCRIPTION OF THE DRAWING

The sole FIGURE herein comprises a semipictorial, schematic diagram of one embodiment of a servosystem in accordance with the present invention.

DESCRIPTION OF THE PREFERRED EMBODIMENT

Referring to the FIGURE, liquid fuel is fed from a source 10 through a duct 11, a shutoff valve 12, a duct 13 and a servocontrol valve 14 via a duct 15 to one manifold 16 of a gas turbine or jet engine 18. A source of gaseous fuel 20 passes fuel through a duct 21, a shutoff valve 22, a duct 23, a servocontrol valve 24 and a duct 25 to a second manifold 26 of the jet engine 18.

The liquid fuel valve 14 and gas fuel valve 24 are each bidirectionally driven by a corresponding servomotor 30, 32. Each of the servomotors 30, 32 also drive a related potentiometer 34, 36. Each of the potentiometers 34, 36 have a suitable voltage applied to a terminal 38, 40 thereof causing a voltage proportional to the position of the valve on conductors or lines 42, 44. Voltages on the lines 42, 44 are applied to related differentiators 46, 48 which provide rate control signals to a summing network 50, and through additional related differentiator networks 52, 54 which provide rate control signals to the respective terminals 56, 58 of one pole 60 of a relay 62. An armature 64 of the relay connects to a summing network 66, the output of which feeds an amplifier 68 used for controlling the closing of the offgoing valve during a crossover. A closing rate reference signal input to the summing network 66 is derived from a potentiometer 70 which has an operating voltage applied to a terminal 72 thereof. The output of the amplifier 68 is supplied to an armature 74 of a second pole 76 of the relay 62, respective contacts 78, 80 of which are connected via conductors or lines 82, 84 to respective ones of the valve control servomotors 30, 32. The lines 82, 84 are also connected to corresponding contacts 86, 88 of a third pole 90 of the relay 62, the armature 92 of which is connected to the output of another amplifier 94 which is used to control the oncoming valve and the valve in use during the running of the engine.

The summing network 50 also has applied thereto an output signal from the running engine controls 96. The controls 96 are responsive to the speed of the gas turbine in the form of signals generated from any suitable form of well known shaft velocity detector 98 (Ng). Similarly, a temperature monitor 100 (T) monitors the exhaust gas of the burner section 102, and shaft speed signals are delivered to the engine control 96 from a speed monitor 104 (Nf) on the free turbine shaft. The engine controls 96 are not part of the present invention, but the capability of the engine controls 96 are utilized so as to completely minimize transient operation during crossover, as is described more fully hereinafter. A suitable form of engine controls 96 are of the type that select from among the various demands indicated by the monitors 98, 100, 104 so as to supply a fuel control signal indicative of the controlling parameter which requires the least fuel at any given time, and to govern the fuel valve in such a fashion so as to supply the correct amount of fuel. The servoloop which includes the engine controls 96, the amplifier 94, the motors 30, 32 and valves 14, 24 are defined herein as an engine running control servoloop.

The gas turbine 18 includes a compressor stage 106 and a driven turbine stage 108 as well as a free turbine 110 which is coupled to a shaft 112 to a rotary power utilization device, such as an electric generator 114.

The particular nature of the utilization apparatus is not germane to the present invention, and similarly, a different form of gas turbine may utilize the teachings of the present invention, as is apparent to those skilled in the art.

The embodiment of the invention illustrated in the FIGURE is shown in a running condition with liquid fuel being supplied to the gas turbine 18, the running amplifier 94 being connected to the motor 30, to continuously modulate the amount of fuel being presented to the manifold 16 for controlling the operation of the engine. Similarly, the amplifier 68 is connected to the motor 32 which has driven the valve 24 into the fully closed position and holds it there.

To initiate a crossover, the relay 62 is energized, such as by closing a switch 116 connected at a terminal 118 to a suitable source of electric potential. This will cause a transfer of position of each of the armatures 64, 74, 92 of the relay 62. At the moment before transferring the contact of the relay 62, the motor 30 is assumed to be at rest as a result of the running servosystem having satisfied engine demands and having established a position of the valve 14 which supplies the correct amount of fuel for engine needs. At the moment of transferring of the contacts, the valve 14 remains at rest since there is initially no signal applied to the motor 30. Similarly, the motor 32 is at rest and the valve 24 is in its fully closed position at the initial moment of transfer of the relay contacts. When the relay contacts are fully transferred, the terminal 56 of poles 60 of the relay 62 provides no voltage input to the summing network 66 because the motor 30 is at rest and therefore the potentiometer 34 is supplying a constant voltage which differentiates to zero through the network 54. However, with a suitable potential applied to terminal 72 of potentiometer 70, the potentiometer 70 provides the closing rate reference signal to the summing network 66 so the amplifier 68 will supply a driving signal through contact 78 to motor 30 with a potential of a suitable polarity to begin causing the motor 30 to drive the valve 14 in a closed direction. As soon as motor 30 begins to close valve 14, the potentiometer 34 supplies a commensurately varying voltage through differentiating network 48 into the summing network 50. This is of such a polarity as to cause amplifier 94 to further drive the motor 32 into the open direction. The potentiometer 36 however is supplying a time-varying potential through differentiator 46 to the summing network 50, this potential being opposite to the potential applied to the summing network 50 through the differentiator 48. These tend to cancel each other, but to the extent that if these do cancel then motor 32 does not receive a driving signal from the amplifier 94 and tends to lag in its rate of opening valve 24 behind the rate at which motor 30 is closing the valve 14. The valve 14 will close at a constant rate which is determined by the chosen position of the potentiometer 70. The valve 14 closes at a constant rate because of the connecting together of amplifier 68, through servomotor 30, through feedback potentiometer 34, through differentiating network 54, through summing network 66 back to the input of amplifier 68, constitutes a velocity control servo loop wherein the application of an additional voltage to summing point 66 will cause servomotor 30 to operate at a constant speed proportional to the additional voltage applied to summing point 66. This is a technique well known to those versed in the art.

The potentiometer 34 is also connected through another differentiating network 48, to summing network 50. Since valve 14 is closing at a constant rate, the voltage from potentiometer 34 into differentiating network 48 is varying at a constant rate, therefore the rate control voltage output of differentiating network 48 into summing network 50 is a constant voltage. This constant voltage causes the velocity control servo loop consisting of amplifier 94, servomotor 32, potentiometer 36, differentiating network 48, summing point 50, to the input of amplifier 94, to cause servomotor 32 to operate at a constant speed proportional to the rate control voltage applied at the output of differentiating network 48 to summing point 50. Since this voltage is a function of the rate at which valve 14 is closing, it can readily be seen by those skilled in the art that the rate of opening of valve 24 can be made precisely the same as the rate of closure of valve 14 and that the closing rate of valve 14 is determined solely by the position of rate control potentiometer 70. If all of the parameters of the system were ideal and perfectly matched, valve 24 would open at precisely the same rate as valve 14 closes, there being a constant volume of fuel as a result of the sum of fuel from source 10 and from the source 20 during the crossover process. Naturally, this cannot be achieved in a practical system, however, such differences as do exist are adequately compensated for by the main engine running control servoloop including the engine controls 96, the summing network 50, and the amplifier 94. If perfect crossover were achievable through the servosystem of the present invention, there would need be no signal from the engine controls 96 to the summing network 50 since engine parameters would remain perfectly satisfied. However, differences in the oncoming and offgoing fuel systems and servos, as well as changes in the actual parameters of the engine 18 result in some control of the oncoming valve 24 as a result of signals applied to the summing network 50 from the engine controls 96.

It is a feature of this invention that the engine controls 96 through the amplifier 94 can mitigate any system differences to insure a substantially non-transient crossover from one source of fuel 10 to the other source of fuel 20 (and vice versa).

The liquid valve 14 will continue to close until it reaches the fully closed position and is driven against a stop. At this time, the potentiometer 34 no longer supplies a signal through summing network 50 and amplifier 94 so no signal is applied to motor 32 and it stops, (subject only to engine running control signals from the engine controls 96). The potentiometer 34 also no longer supplies a signal through contact 58 to the summing network 66 so that the potential from the potentiometer 70 to the amplifier 68 is the only signal tending to drive the motor 30 further against the stops. The system herein may readily be implemented in a 400 cycle servo configuration, which is well known. In such a configuration, no damage results from driving the servomotors 39, 32 against the stops when they are in a fully closed position, as is well known in the art. In the present embodiment, the valve 14 may comprise a variable window type valve. The valve 24 may preferably be of the butterfly type. However, it should be understood by those skilled in the art that the principles of the present invention are equally useful in a gas/gas system, or in a liquid/liquid system. In such case, it is possible that the valves and their operating parameters may be even more closely matched than is required when utilizing the present invention. As is described hereinbefore with respect to the prior art, there are numerous ways in which the teachings of the present invention may be utilized in a dual fluid system.

Although the invention has been shown and described with respect to a preferred embodiment thereof, it should be understood by those skilled in the art that the foregoing and other various changes and omissions in the form and detail thereof may be made therein without departing from the spirit and scope of the invention which is to be limited and defined only as set forth in the following claims.

Having thus described a typical embodiment of my invention, that which I claim as new and desire to secure by Letters Patent of the United States is:

1. A system for controlling the flow of fluid to a fluid utilization means, where means responsive to a condition of operation of the fluid utilization means provide a control signal for controlling the flow thereto of either one of two fluids, comprising:

first and second servomotor driven valves which respectively control the flow of a selected fluid and of an unselected fluid into said fluid utilization means;

rate control apparatus connected to said servomotor driven valves for supplying first and second rate control signals indicative of the rate of opening or closing of said first and second servomotor driven valves, respectively;

a source of a rate reference signal representative of the desired opening and closing rates of said first and second servomotor driven valves, respectively;

a first servoloop concurrently responsive to the selection of said selected fluid, said control signal and to said rate control signals for providing a first servomotor signal to said first servomotor driven valve whereby said first servomotor driven valve is opened at substantially the desired opening rate;

a second servoloop concurrently responsive to the selection of said selected fluid, said rate reference signal and said second rate control signal for providing a second servomotor signal to said second servomotor driven valve whereby said second servomotor driven valve is closed at substantially the desired closing rate; and switching means connected to said rate control apparatus, said servomotor driven valves and said servoloops for respectively applying said first and second servomotor signals to said first and second servomotor driven valves and said second rate control signal to said second servoloop in response to the selection of said selected fluid.

2. The control system according to claim 1 wherein one of said fluids comprises a liquid and the other of said fluids comprises a gas.

3. The control system according to claim 2 wherein said fluid utilization means comprises a gas turbine having a gaseous fuel manifold and a liquid fuel manifold.

* * * * *

PO-1050
(5/69)

UNITED STATES PATENT OFFICE
CERTIFICATE OF CORRECTION

Patent No. 3,706,201        Dated December 19, 1972

Inventor(s)    JOHN S. WILLIAMSON

It is certified that error appears in the above-identified patent and that said Letters Patent are hereby corrected as shown below:

Front page, item 72, "Colo." should read -- Conn. --

Front page, item 73, "Colo." should read -- Conn. --

Signed and sealed this 29th day of May 1973.

(SEAL)
Attest:

EDWARD M. FLETCHER, JR        ROBERT GOTTSCHALK
Attesting Officer              Commissioner of Patents